E. H. STEEDMAN.
TONGUE SWITCH.
APPLICATION FILED MAR. 17, 1911.
1,049,618.
Patented Jan. 7, 1913.
3 SHEETS—SHEET 1.
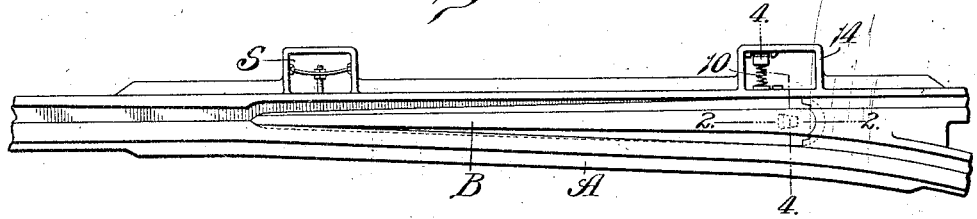
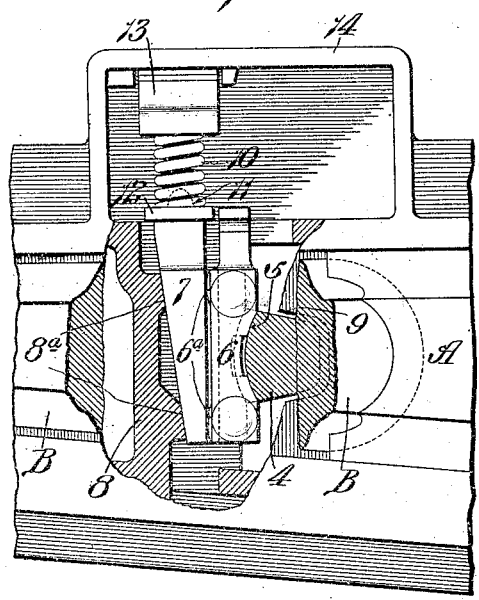
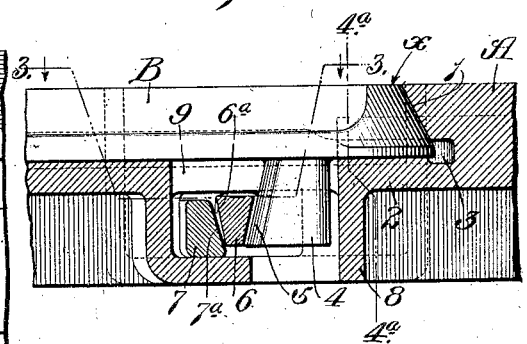
Witnesses:
Geo. R. Ladson,
Nells L. Church
Inventor,
E. H. Steedman.
By Paine Bakewell Atty.

E. H. STEEDMAN.
TONGUE SWITCH.
APPLICATION FILED MAR. 17, 1911.
1,049,618.
Patented Jan. 7, 1913.
3 SHEETS—SHEET 2.
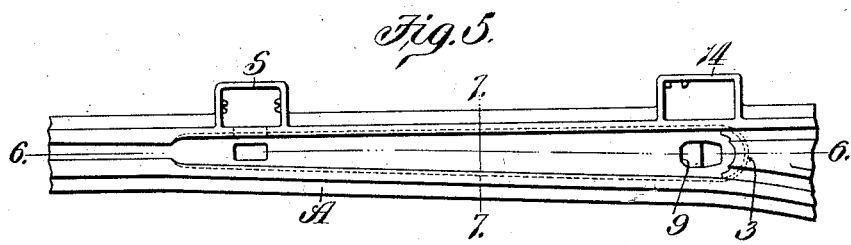
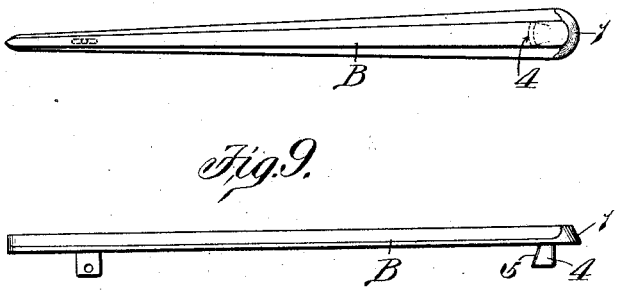
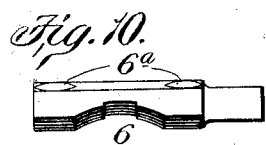
Witnesses:
Inventor,
E. H. Steedman.
By Paul Bakewell Atty.

E. H. STEEDMAN.
TONGUE SWITCH.
APPLICATION FILED MAR. 17, 1911.
1,049,618.
Patented Jan. 7, 1913.
3 SHEETS—SHEET 3.
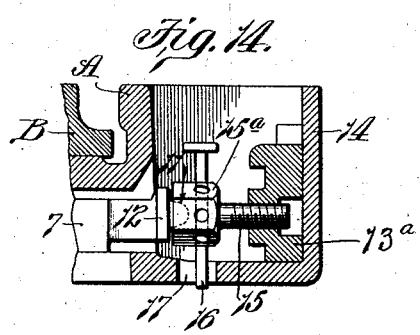
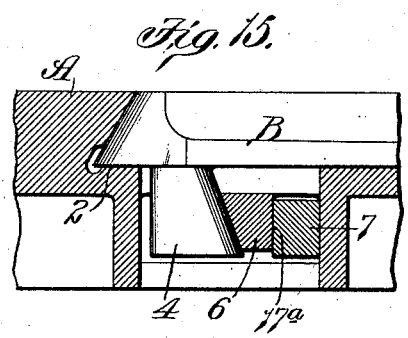
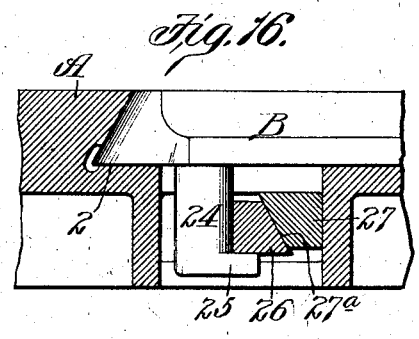
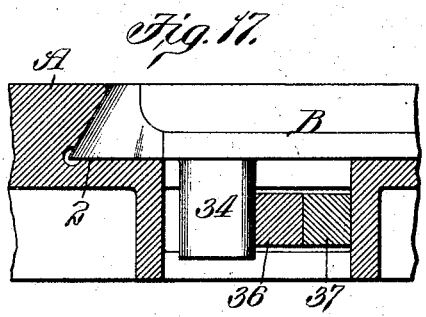
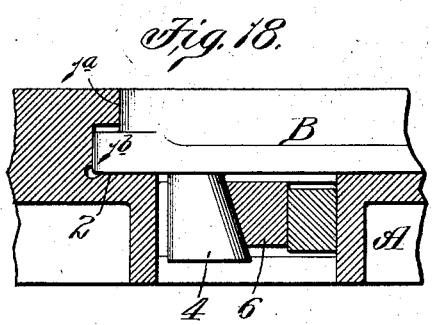
Witnesses:
Inventor,
E. H. Steedman.
By Paul Bakewell Atty.

UNITED STATES PATENT OFFICE.

EDWIN H. STEEDMAN, OF ST. LOUIS, MISSOURI, ASSIGNOR TO CURTIS & COMPANY MANUFACTURING COMPANY, OF WELLSTON, MISSOURI, A CORPORATION OF MISSOURI.

TONGUE-SWITCH.

1,049,618.  Specification of Letters Patent.  Patented Jan. 7, 1913.

Application filed March 17, 1911. Serial No. 615,070.

*To all whom it may concern:*

Be it known that I, EDWIN H. STEEDMAN, a citizen of the United States, residing at St. Louis, Missouri, have invented a certain new and useful Improvement in Tongue-Switches, of which the following is a full, clear, and exact description, such as will enable others skilled in the art to which it appertains to make and use the same.

This invention relates to railway switches, and particularly to tongue switches such as are used in street railway track structures.

The main object of my invention is to provide a tongue switch that can be manufactured cheaply of manganese steel castings or other suitable hard steel, and which also possesses the following good qualities or characteristics that are necessary to a successful commercial tongue switch: safety, durability, ample bearing surfaces for the tongue, adjustability, and ease of maintenance.

In order to manufacture cheaply of manganese steel castings, the parts of the switch must be of such design that they can be cast with minimum trouble and expense in the foundry and also assembled into a working switch without other finish than is usual on castings in a foundry, such, for example, as removing gates and fins and grinding off rough lumps.

My improved switch is so designed that it can be manufactured cheaply from manganese steel castings and without the necessity of using spelter in parts; it is safe because it is designed in such a manner that the tongue cannot be kicked laterally nor vertically by a passing wheel and thus produce a "split switch"; it is durable because it is formed from manganese steel castings where ample bearing surfaces are provided for the tongue, and in which bearing surfaces are so arranged that the point of the tongue cannot rise; it is adjustable because the coöperating parts are so designed that lost motion between the coöperating bearing surfaces can be taken up easily; and it can be maintained easily because the coöperating parts are designed in such a manner that any worn part can be replaced quickly by a new part which will be sure to fit properly.

The means which I prefer to use for taking up lost motion and wear on the coöperating parts of the switch and for preventing upward movement of the tongue is novel and forms one of the features of my invention, and the switch also possesses numerous other desirable and novel features which will be hereinafter pointed out.

Figure 1 of the drawings is a top plan view of a tongue switch constructed in accordance with my invention; Fig. 2 is an enlarged vertical sectional view taken on the line 2—2 of Fig. 1; Fig. 3 is a horizontal sectional view taken on the irregular section line 3—3 of Fig. 2, looking in the direction indicated by the arrow; Fig. 4 is an enlarged vertical cross sectional view taken on the line 4—4 of Fig. 1; Fig. 4$^a$ is a cross section on the line 4$^a$—4$^a$ of Fig. 2; Fig. 5 is a top plan view of the body part of the switch; Fig. 6 is a longitudinal vertical sectional view taken on the line 6—6 of Fig. 5; Fig. 7 is a cross sectional view taken on the line 7—7 of Fig. 5; Fig. 8 is a top plan view of the tongue; Fig. 9 is a side elevational view of the tongue; Figs. 10 and 11 illustrate the quarter-box and the wedge, respectively; Figs. 12 and 13 illustrate the spring seat and the spring, respectively; Fig. 14 is a vertical cross sectional view illustrating a manually-operated device for taking up lost motion and wear on the tongue and body part of the switch; and Figs. 15, 16, 17 and 18 are vertical sectional views illustrating various modifications of my invention.

Referring to Figs. 1 to 13 of the drawings which illustrate one form of my invention, A designates the body part of the switch, and B designates the oscillating tongue that is mounted in said body part, both of said members being preferably cast from manganese steel or some other suitable hard steel. The extreme heel end portion 1 of the tongue is substantially semi-conical-shape in cross section, as shown in Figs. 1, 2 and 9, and the body part A of the switch is provided with a pocket that conforms to the shape of said semi-conical-shaped portion 1, thereby producing coöperating conical bearing surfaces on the heel end of the tongue and on the body part of the switch which are located adjacent the tread of the tongue and which are ample to restrain lateral forces which tend to move the tongue crosswise of the body part. The fact that the main pivot bearing is located adjacent the running surface is a very desirable feature in a tongue switch for the lateral forces act near this plane and therefore the bearing surfaces which resist these lateral forces should be located at that point. The bottom face of the tongue rests upon a horizontal bearing surface or floor on the body part A of the switch and the portion 2 of this floor extends rearwardly or back of the point X on the tread face of the tongue which a wheel first strikes in passing onto the heel end of the tongue so as to provide a relatively large horizontal bearing surface to support the vertical forces acting at the heel end of the tongue. By constructing the switch in this manner I not only eliminate the possibility of the tongue tilting or cocking up when a wheel passes onto same but I also distribute the downward forces over a relatively large surface and obtain sufficient bearing area at the heel end of the tongue to prevent wear which eventually would cause the tongue to rock vertically. The overhanging wall on the body part A, which embraces the curved portion 1 on the heel of the tongue, tends to hold said tongue firmly down on its horizontal bearing surface when the tongue is forced back into the recess, and it gives a conical surface of rotation of approximately 180°, see Figs. 2, 3 and 4ª. Consequently, there is no possibility of the switch being "split" by an end kick on the tongue produced by lateral thrusts of a passing wheel, because the conical pocket in the body part A encompasses practically all portions of the tongue rearward of the center of oscillation. The pocket in the body part A of the switch which receives the pivotal bearing portion 1 on the tongue is preferably provided at its lower end with a semi-annular-shaped recess 3 into which the extreme lower edge of the portion 1 projects, as shown in Fig. 2, one advantage of constructing the switch in this manner being that the pocket in the body part which receives the heel portion 1 of the tongue can be formed at a low cost because it is not necessary to finish or grind the entire tongue-engaging face of the pocket or form any sharp corners or angles in same, another advantage being that the recess 3 serves as a collecting chamber for dirt that works through the joint between the tongue and the body part A.

The tongue B is provided on its under side with a depending lug 4 which is preferably formed integral with the tongue and arranged in such a manner that the conical surface 5 on the front side thereof is concentric with the axis of rotation of the tongue, said lug coöperating with the heel end portion 1 of the tongue to form a relatively large conical pivot for the tongue composed of an upper portion 1 that lies adjacent the tread of the tongue and a lower portion 5 which lies in a lower horizontal plane than the tongue. With such a structure it is only necessary that the coöperating bearing surfaces on the tongue and body part be accurately cast in the foundry and any bumps or irregularities removed by rough grinding, for the adjusting means hereinafter described takes up all wear, and any wear of these surfaces tends to bring the surfaces to a better bearing.

The switch is provided with a spring-box S of any preferred design, and means of novel construction is provided for locking the tongue in the body part A, said means being so designed that it takes up lost motion and wear between the bearing surfaces of the body part and tongue, and also tends to prevent upward movement of the tongue. The means shown in Figs. 1 to 4 for accomplishing this consists of a bearing member or quarter-box 6 having a tapered curved surface that coöperates with the conical face 5 on the depending lug 4 on the tongue, and a device 7 for holding said bearing member in engagement with said lug and exerting rearward and downward pressure on said lug and tongue. The lug 4, bearing member 6 and locking device 7 are arranged in a housing 8 on the under side of the body part A of the switch, and said housing is preferably formed integral with said body part. The lug 4 on the tongue projects downwardly into the housing through an elongated opening 9 in the top wall of the housing, and the bearing member 6 extends transversely of said opening and bears against the top wall of the housing. The device 7 which locks the quarter-box or bearing member in position, consists of a wedge arranged between the said quarter-box 6 and the end wall of the housing 8, and a coiled compression spring 10 is provided for exerting pressure on the wedge 7 so as to automatically take up any lost motion or wear between the coöperating bearing surfaces on the tongue and body part or between the quarter-box and the lug on the tongue with which it coöperates. This spring is preferably arranged on a shank 11 on the wedge between a collar 12 on said shank and a spring seat 13 which is carried by a bracket 14 on the body part A, and the inclined face of said wedge which bears against the housing is formed at such an angle that the wedge will not be forced outwardly or become accidentally displaced by any pressure which the lug 4 might exert on the quarter-box or bearing member 6 when the wedge is in service. The face 7ª of the wedge which engages the quarter-box 6 is so formed that it tends to move said box upwardly and thus hold it tightly against the top wall of the housing. If desired, the quarter-box 6 can be provided with two raised bearing surfaces 6ª, as shown in Fig. 3, which are separated from each other so that the wedge will engage said box at only two points and thus insure a positive engagement between said parts. It is also preferable to provide the housing 8 with two separated bearing surfaces 8ª which the wedge 7 engages as such a construction overcomes the necessity of accurately grinding or shaping the coöperating faces of the wedge and housing and the wedge and bearing member 6 to insure a tight fit between said parts.

The spring-actuated wedge 7 automatically takes up any wear or lost motion on the coöperating parts of the switch and holds the tongue securely in position so that a tight joint is always insured at the point in the tread surface where the heel end of the tongue bears against the body part of the switch. And another desirable feature of such a structure is that the only parts which have a definite or fixed relation to each other are the pivot portion 1 on the heel of the tongue and the seat for same in the body part A. Consequently, the cost of manufacturing the switch is reduced to a minimum because it is not necessary to accurately fit or shape a number of coöperating surfaces on the tongue and body part of the switch, and when the switch is repaired a new part will fit in a used part without re-grinding or re-shaping the surfaces of the used part. The tongue can be removed easily from the body part of the switch owing to the fact that the wedge, spring, and spring-seat are so constructed and arranged that a crow-bar or common track tool can be used for compressing the spring and for lifting the spring-seat out of operative position, as indicated by broken lines in Fig. 4. Therefore, a switch of the construction above described can be maintained in proper working condition at a low cost because an unskilled laborer can replace a worn part quickly by simply prying out the spring and spring-seat with a crow-bar and substituting a new part for the worn part, the tongue, body part, and quarter-box being so designed that the bearing surfaces on a new part will accurately fit the coöperating bearing surfaces of the old members of the switch, namely, the members which do not have to be renewed.

While I prefer to use a spring 10 or other device for causing the wedge 7 to automatically take up the lost motion and wear, a manually-operated means could be used instead of said spring for retaining the wedge in position, and in Fig. 14 I have illustrated such a means which consists of a screw 15 arranged in a threaded opening in a removable bearing member 13ª mounted in the bracket 14, said screw being provided at its inner end with a seat for receiving a cylindrical or conical-shaped projection on the shank of the wedge. Said screw is provided with a head or turning-piece 15ª so as to enable it to be turned to force the wedge tightly against the bearing member 6 so as to take up wear and lost motion, and after said wedge has been adjusted properly it can be locked in position by means of a pin 16 inserted in the head 15ª and projecting into a hole 17 in the bottom wall of the bracket 14.

In Fig. 15 I have illustrated a switch that is quite similar in construction to the switch previously described except that the wedge 7 which coöperates with the quarter-box or bearing member 6 is provided with a straight vertical surface 17ª that engages a straight vertical surface formed on said quarter-box, the quarter-box being so designed that it laps over the lug 4 on the tongue and thus forces the tongue downwardly tightly against the horizontal bearing surface 2 on the floor of the body part of the switch.

While I prefer to use a lug 4 provided with a tapered or conical-shaped surface which the quarter-box 6 engages, the tongue could be provided with a lug 24 having a flange 25, as shown in Fig. 16 and the quarter-box 26 designed in such a manner that it projects over said flange so as to prevent upward movement of the tongue, a wedge 27 which coöperates with said quarter-box having an inclined face 27ª that coöperates with an oppositely inclined face on the quarter-box and thus exerting downward pressure on said quarter-box.

In the embodiment of my invention shown in Fig. 17, no means other than the overhanging wall of the body part A of the switch is provided for exerting downward pressure on the tongue, the lug 34 on the under side of the tongue being straight and the quarter-box 36 and wedge 37 being so designed that they merely exert endwise pressure on the tongue so as to hold the pivot portion on the heel end of same in the seat in the body part A.

In Fig. 18 I have illustrated a structure in which the pivot portion 1ª on the heel end of the tongue is semi-cylindrical-shaped in cross section instead of conical-shaped, as in the structures previously described, the body part A of the switch being provided with a pocket that conforms to the shape of the pivot portion 1ª, and the tongue being provided at its lower end with a projection or extension 1ᵇ that rests upon the horizontal bearing surface 2 which extends rearwardly or back of the point where a wheel first strikes the heel end of the tongue in passing onto same. Vertical movement of the tongue is prevented by means of an undercut bearing member or quarter-box 6 that engages a lug 4 on the under side of the tongue provided with a tapered or conical face which said bearing member engages, but, if desired, the means shown in Fig. 16 for preventing upward movement of the tongue could be used in the structure illustrated in Fig. 18.

While the structures previously described vary slightly in details of construction, they all embody the same characteristics, namely, first, an ample pivot bearing between the body and tongue adjacent the running surface and the lateral distributing forces; second, a simple straight floor to the switch body under-cutting at the heel end, giving an ample horizontal bearing for the tongue in the rear of the pivot bearing joint at the running surface, thus preventing depression of the heel end and raising of the point of the tongue; third, very short portion of the tongue back of center of oscillation exposed to lateral pressure of wheels, reducing to a negligible point the liability of the heel end of the tongue receiving an end kick from a passing wheel; fourth, an oblong simple hole in body to permit of tongue being inserted into undercut heel bearing; fifth, a tongue with a straight bottom and a simple rough dependent lug having a front surface concentric with rear pivot bearing; sixth, a roughly made but efficient adjusting device that takes up lost motion, both horizontally and vertically, and holds the tongue down to its floor, and back against its pivot bearing on the body part; and seventh, all parts so simple in design that they may be cast sufficiently accurate and smooth in the foundry so that good smooth commercial castings with only ordinary foundry finish may be assembled into new switches or used for repairing a worn or broken switch.

Having thus described my invention, what I claim as new and desire to secure by Letters Patent is:

1. A tongue switch comprising a tongue provided at its heel end with a curved pivotal bearing surface which is located adjacent the wheel-tread surface of the tongue, a body part having a seat which receives said pivotal bearing surface, a lug depending from said tongue a short distance in front of the heel end thereof and projecting through an opening in said body part which is of such dimensions that the tongue can be adjusted longitudinally of said body part to compensate for wear, a member that bears against the front side or front face of said lug and thus holds said tongue in position, said lug and member being so formed that the tongue cannot move upwardly, and a relatively large horizontal bearing surface on the floor of said body part on which the extreme heel end portion of the tongue bears, said horizontal bearing surface extending rearwardly beyond the exposed joint between the heel of the tongue and said body part.

2. A tongue switch comprising a tongue provided at its heel end with a curved pivotal bearing surface which is located adjacent the wheel-tread surface of the tongue, a body part having a seat which receives said pivotal bearing surface, a lug depending from the under side of said tongue in advance of the extreme heel end thereof and projecting through an opening in said body part which is of such dimensions that the tongue can be adjusted longitudinally of said body part to compensate for wear, a member that bears against the front side or front face of said lug and thus holds said tongue in position, a wedge coöperating with said member, a spring acting on said wedge, and a bracket on said body part on which said spring bears.

3. A tongue switch comprising a cast metal tongue provided at its heel end with an approximately conical-shaped pivotal bearing surface whose upper end terminates at the wheel-tread surface of the tongue, a cast metal body part having an undercut pocket for receiving the conical-shaped pivotal bearing surface of the tongue, an integral depending lug on said tongue, said body part being provided with an elongated opening through which said lug projects, and means coöperating with said lug to hold the tongue in the pocket in the body part and also prevent upward movement of the tongue.

4. A tongue switch comprising a body part, a tongue provided at its heel end with a curved pivot portion which fits in a seat or pocket in the body part, a depending lug on said tongue, a horizontal bearing surface formed integral with said body part and extending rearwardly beyond the exposed joint between the tongue and body part, and an adjustable device arranged between said body part and the front side of the depending lug on the tongue which holds the pivot portion on the tongue in its seat and also prevents the tongue from moving upwardly off its horizontal bearing surface.

5. In a tongue switch, an oscillating tongue, a body part, and an approximately conical-shaped pivot portion on the heel end of the tongue that fits in an undercut pocket formed in said body part, said body part having a horizontal bearing surface for the tongue that extends rearwardly or back of the exposed pivot joint between said tongue and body part.

6. In a tongue switch, an oscillating tongue provided with pivotal bearing surfaces composed of an upper portion arranged at the extreme heel end of the tongue adjacent the tread surface thereof and a lower portion arranged under the tongue, and in advance of said upper portion, both of said portions having approximately conical surfaces, a body part having a bearing surface that conforms to the shape of the conical surface of said upper portion, said body part being so formed that the tongue can be adjusted longitudinally of said body part, and a removable member having a surface that conforms to the shape of the conical surface of said lower portion.

7. In a tongue switch, an oscillating tongue provided with pivotal bearing surfaces composed of an upper portion arranged at the extreme heel end of the tongue adjacent the tread surface thereof and a lower portion arranged under the tongue and in advance of said upper portion, a body part having a bearing surface that conforms to the shape of said upper pivotal bearing surface and also a horizontal surface on which the heel end of the tongue bears, said body part being so formed that it does not contact with the lower pivotal bearing surface on the tongue, a removable member which engages only that side of the lower pivotal bearing surface of the tongue which lies nearest to the point of the tongue, and means coöperating with said member for taking up wear and lost motion on the coöperating pivotal surfaces of the tongue and body part.

8. A tongue switch comprising a body part, an oscillating tongue, concentric semi-conical-shaped pivotal bearing surfaces on the heel end portion of the tongue arranged in different horizontal planes, an undercut pocket in the body part for receiving the upper pivotal bearing surface of the tongue, and a removable bearing member arranged in said body part under the tongue for engaging the lower pivotal bearing surface of the tongue.

9. In a tongue switch, a tongue having an upper running surface and a lower bearing surface approximately parallel to said running surface and extending practically the entire length of the tongue, a conical pivotal surface at the heel end of the tongue arranged with its larger diameter adjacent the lower bearing surface of the tongue, a downwardly projecting lug on the tongue arranged in advance of the heel end thereof so as to provide a relatively great horizontal bearing surface between the rear side of the lug and the heel end of the tongue, the forward face of said lug consisting of a conical surface which has approximately the same center line of revolution as the conical pivotal surface at the heel end of the tongue and arranged with its smaller diameter adjacent the lower bearing surface on the tongue, a body part comprising the usual running surfaces, a floor between said running surfaces consisting of an approximately horizontal plane extending the full length of the tongue and adapted to act as a bearing surface for the tongue, a conical pivotal surface or socket on said body part extending up from said floor and adapted to receive the conical pivotal surface at the heel end of the tongue, said floor having a hole arranged in advance of said heel socket which is so proportioned that a sufficient clearance is provided for the depending lug on the tongue to permit free movement of the tongue, and adjustable means in the body part coöperating with the conical forward surface of the depending lug on the tongue to hold the heel end of the tongue in the socket provided for same in the body part and also for holding the tongue down against the floor of said body part.

10. In a tongue switch, a tongue provided with a conical heel end portion, a body part having the usual running surfaces and also a depressed horizontal floor extending the entire length of the tongue and adapted to form a bearing surface on which the under side of the tongue rests, a conical surface or socket in said body part between said horizontal floor and running surfaces whose larger diameter is located adjacent said floor, said socket being adapted to act as a pivotal surface for the conical heel end portion of the tongue, an integral lug depending from the under side of the tongue and arranged in front of the heel end portion of the tongue, a conical surface on the front side of said lug which has approximately the same center line of revolution as the conical surface on the heel end of the tongue, the floor of said body part being provided with a hole or opening for receiving the depending lug on the tongue, said hole being so proportioned that said lug can move freely therein, a bearing block coöperating with the conical bearing surface on the front side of said lug, coöperating horizontal bearing surfaces on the body part and on said bearing block which prevent said bearing block from moving upwardly relatively to the body part, and an adjustable wedge arranged with its front side in engagement with said body part and its rear side in engagement with said bearing block.

11. In a tongue switch, a tongue, a body part, an approximately conical-shaped pivotal bearing surface on the heel end of the tongue whose upper end terminates at the wheel-tread surface of the tongue, an undercut pocket in the body part for receiving the conical-shaped pivotal bearing surface on the tongue, a lug depending from the tongue, said body part being provided with an elongated opening through which said lug projects, and means coöperating with said lug to hold the pivotal bearing surface on the tongue in the pocket provided for same in the body part of the switch and also prevent the tongue from moving upwardly.

In testimony whereof I hereunto affix my signature in the presence of two witnesses, this 7th day of March 1911.

EDWIN H. STEEDMAN.

Witnesses:
R. E. WINKLER,
L. C. BLAKE.